United States Patent [19]

Wise

[11] Patent Number: 5,783,923

[45] Date of Patent: Jul. 21, 1998

[54] METHOD AND APPARATUS FOR MULTIPLE-INPUT, MULTIPLE OUTPUT FEEDBACK CONTROL OF VARIABLE LOAD SYSTEMS

[75] Inventor: William L. Wise, P.O. Box 1382, Mountain View, Calif. 94042

[73] Assignee: William L. Wise, Mountain View, Calif.

[21] Appl. No.: 568,207

[22] Filed: Dec. 6, 1995

Related U.S. Application Data

[60] Provisional application No. 60/002,343 Aug. 15, 1995.

[51] Int. Cl.[6] .................................................. G05B 19/29
[52] U.S. Cl. .......................... 318/601; 318/615; 318/683; 388/809; 331/17; 331/25; 331/DIG. 2
[58] Field of Search ............................. 331/1 R, 17, 25, 331/DIG. 2; 318/571, 569, 562, 600, 601, 604, 606, 632, 615, 616, 617, 683, 572; 388/911, 809, 815

[56] References Cited

U.S. PATENT DOCUMENTS

| | | | |
|---|---|---|---|
| 4,103,314 | 7/1978 | Case | 360/78 |
| 4,320,880 | 3/1982 | Sibley | 246/34 R |
| 4,839,573 | 6/1989 | Wise | 318/615 |
| 4,855,689 | 8/1989 | Kinkel | 331/17 |
| 5,173,649 | 12/1992 | Wise | 318/611 |

FOREIGN PATENT DOCUMENTS

C2 501 815  5/1995  Sweden .

OTHER PUBLICATIONS

North, David M., Control System Key to B-2 Flight Qualities, *Aviation Week & Space Technology*, Apr. 17, 1995, pp. 46–51.

*Primary Examiner*—John W. Cabeca
*Attorney, Agent, or Firm*—Townsend and Townsend and Crew LLP; Kenneth R. Allen

[57] ABSTRACT

In a feedback control system with multivariable inputs and outputs, a network of plant actuators, each controlled by self-adaptive feedback control loops with pole-tracking zeroes, is provided as a plant or output load for a network of generally-conventional controllers. Each of the controllers sees a constant load, so the controller network can be viewed as having a constant gain-bandwidth characteristic transmission. The network of plant actuators cancels the effects the load inertias and its variations.

5 Claims, 1 Drawing Sheet

METHOD AND APPARATUS FOR MULTIPLE-INPUT, MULTIPLE OUTPUT FEEDBACK CONTROL OF VARIABLE LOAD SYSTEMS

CROSS-REFERENCE TO RELATED APPLICATION

This application claims benefit of provisional patent application Ser. No. 60/002,343, filed Aug. 15, 1995.

BACKGROUND OF THE INVENTION

This invention relates to feedback control systems and in particular to multivariable servo control systems suitable to control dynamically-variable loads, where a plurality of output signals, some or all of which provide feedback signals, are controlled in response to a plurality of input signals.

In servo control, it is desirable to provide high-speed response to real-world (variable) loading with minimal or zero step-response overshoot. Conventional servo control systems employing frequency-domain analysis of servo loops are typically limited by assumptions respecting steady state and dynamic conditions which impact on such criteria as allowable phase margin and load variation limits, which lead to dangerous step response overshoot. As an example, high-performance fighter aircraft have been known to lapse into uncontrollable oscillation modes under certain flight conditions (including external input from attempted manual override of controls), which are believed to be caused by fundamental flaws in assumptions regarding control system design. Modern multivariable feedback design has been based on state-space modelling, rather than frequency-domain modelling. It is believed that modelling has not been complete and therefore less than adequate because of incorrect assumptions and/or ignorance of important factors.

Reference is made to the text of J. M. Maciejowski, *Multivariable Feedback Design*, Addison-Wesley, 1989, as an example of current thinking about feedback systems. It is believed that this text promotes the same design assumptions and shortcuts which could well have led to performance limits on flights of the B-2 bomber due to step-response overshoot (SRO) (*Aviation Week*, Apr. 17, 1995, p. 49), observed "pilot-induced oscillations" in the Boeing 777 (*Aviation Week*, May 8, 1995, p. 32) and porpoising-induced crashes of the SAAB JAS-39 Gripen high agility fighter (Feb. 2, 1989 and Aug. 8, 1993) and of the US YF-22 high-agility fighter (Apr. 25, 1992), all of which are examples of the dangers of unstable operation modes. The evidently faulty design assumptions include 1) providing generally insufficient loop phase margin in the modeling of the design, 2) sometimes incorporating difference terms in the feedback structures of the servo loops (other than at the summing junction), and 3) failing to take into account dynamically varying inertia in the loading.

The generic design of the control system is believed to be the same for each aircraft. However, part of the new SAAB-based design, which is outlined in Swedish Pat. No. 9401847-0 issued May 22, 1995 owned by SAAB-Scania, clearly has a GH (loop gain) having a difference term.

What is needed is to revisit the design theory behind multivariable control systems and to redesign the control systems to account for dynamically variable loading, particularly to limit Step-Response Overshoot (SRO) essentially to zero degrees by way of large phase margins (ie., well over 45°).

SUMMARY OF THE INVENTION

According to the invention, in a feedback control system with multivariable inputs and outputs, a network of plant actuators, each controlled by self-adaptive feedback control loops with pole-tracking zeroes, is provided as a "plant" or output load for a network of generally-conventional "controllers." Each of the controllers sees a constant load, so the controller network can be viewed as a having a constant gain-bandwidth characteristic ("transmission"). The network of plant actuators cancels the effects the load inertias and its variations.

The invention will be better understood by reference to the following detailed description in connection with the accompanying drawings.

DESCRIPTION OF SPECIFIC EMBODIMENTS

Figure 1:
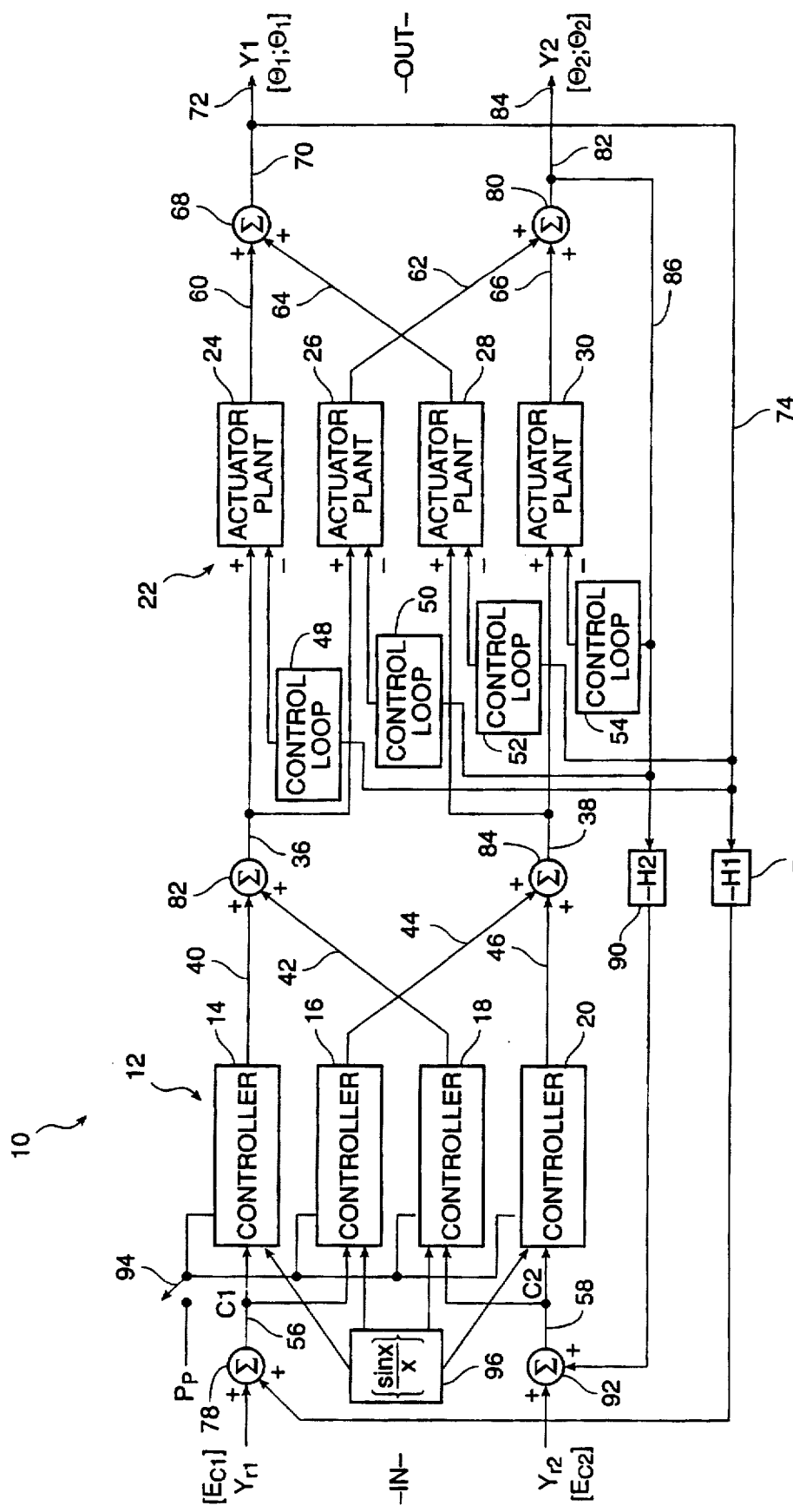
FIG. 1 is a block diagram of a multivariable control system according to the invention.

Referring to FIG. 1, there is shown a block diagram of a multivariable control system 10 comprising a network 12 of constant-load controllers 14, 16, 18, 20 and a network 22 of actuator plants 24, 26, 28, 30. The actuator plants 24, 26, 28, 30 are coupled to receive as input through a set of summers 32, 34 summations 36, 38 of outputs 40, 42 and 44, 46 of selected ones 14, 18 and 16, 20 of the constant load type controllers. Each one of the actuator plants 24, 26, 28, 30 is controlled by self-adaptive feedback control loops 48, 50, 52, 54 (individually weighted, but possibly of identical weighting). The actuator plants have pole-tracking zeroes, as taught in U.S. Pat. No. 4, 839,573, issued June 13, 1989 to William L. Wise. In fact, each of the actuator plants 24, 26, 28, 30 is substantially the device shown as FIG. 1 of the '573 patent, which is incorporated herein by reference and made a part hereof.

According to the invention, the network of actuator plants 24, 26, 28, 30 with pole-tracking zeroes serves as the output loads for the network of controllers 14, 16, 18, 20 such that each of the controllers sees a constant load and has a constant gain-bandwidth characteristic. This servo network architecture provides substantial immunity to uncertainties introduced by widely-varying inertial loads and the stepwise introduction of poles by a manual control mechanism, such as a system operator or pilot, in the case of an aircraft, for example.

The feedback system, in a specific embodiment, including the first controller 14 receiving first input 56 has the same poles and power output characteristic as second controller 16, the second controller 16 also receiving the first input 56. The third controller 18 receiving second input 58 has the same poles and power output as the fourth controller 20, the fourth controller 20 also receiving the second input 58. Output 40 of the first controller 14 and output 42 of the third controller 18 is summed at the first summer 32. Output 44 of the second controller 16 and output 46 of the fourth controller 20 is summed at second summer 34.

The first actuator plant 24 is coupled to receive output 36 of the first summer 32 and the third actuator plant 28 is coupled to receive output 38 of the second summer 34. Both have substantially identical pole-tracking characteristics. The second actuator plant 26 is coupled to receive output 36 of the first summer 32 and the fourth actuator plant 30 is coupled to receive output 38 of the second summer 34. Both also have substantially identical pole-tracking characteristics.

The output 60 of the first actuator plant 24 and output 64 of the third actuator plant 28 are coupled to a third summer 68, the output 70 of the third summer 68 being coupled to a first dynamic load 72 and in a phase inversion feedback loop 74 (through inverting feedback element Hi 76) to a fifth summer 78 at input 56 to the first and second controllers 14 and 16.

The output 62 of the second actuator plant 26 and the output 66 of the fourth actuator plant 30 are coupled to fourth summer 80, output 82 of the fourth summer 80 being coupled to a second dynamic load 84 and in a phase inversion feedback loop 86 (through inverting feedback element H2 90) to a sixth summer 92 at input 58 to the third and fourth controllers 18 and 20.

As will be noted, there are alternative signal paths between the plurality of inputs and the plurality of loads. As an aside, current limiting which is conventionally provided between the actuator plants is not shown.

A sampling clock in the form of a {sinx/x} module 96 is provided to update data to each of the controllers 14, 16, 18, 20, where the system is based on sampled data. This element is explicitly shown herein, although such a module is essential to proper functioning of a sampled data system.

Many controllers in multivariable control systems fail to take into account the impact of manual inputs on the control model. In accordance with the invention, a mechanism is provided for explicitly accommodating the manual input. Accordingly a switch 94 is shown to symbolize the pole which shows up in each controller 14, 16, 18, 20 whenever a manual input, such as pilot reaction time associated with manual control and feedback, is introduced into a physical system. This control system thus takes into account the phenomenon known in the literature as "pilot-induced oscillations" or "PIO," which is often ignored in the design of control systems.

According to the invention, the method of the invention comprises the steps of:

summing outputs of selected constant-load controllers 14 with 18 and 16 with 20 to develop inputs 36 and 38 for targeted or selected actuator plants (input 36 for plants 24 and 26; input 38 for plants 28 and 38). Each one of the actuator plants 24, 26, 28, 30 is controlled by self-adaptive feedback control loops with pole-tracking zeroes, as disclosed in U.S. Pat. No. 4,839, 573, incorporated herein by reference, the actuator plants 24, 26, 28, 30 serving as the output loads for the controllers 14, 16, 18, 20, which are constant loads, as herein explained.

Thereafter, there is the step of summing outputs (60 with 64 and 62 with 66) of selected actuator plants (24 with 28 and 26 with 30) to produce a plurality of actuator signals or outputs 70 and 82.

Those actuator signals or outputs 70, 82 are then used for driving the variable inertia loads 72, 84. The actuator signals 70, 82 are also fed back as weighted feedback signals 48, 50, 52, 54 to the actuator plants 24, 26, 28, 30 to allow pole tracking of zeroes.

Further, the actuator signals are fed back as weighted feedback signals via inverting loop feedback elements 76 and 90 to summers 78 and 92 sharing input to the controllers 14, 16, 18, 20 from multivariable inputs (in this case two) for conventional steady-state feedback control, such that each controller sees a constant load and has a constant gain-bandwidth characteristic.

The invention has now been explained with reference to specific embodiments. Other embodiments will be apparent to those of ordinary skill in the art upon reference to this disclosure. It is therefore not intended that this invention be limited, except as indicated by the appended claims.

What is claimed is:

1. In a feedback control system, a method for controlling multiple outputs signals in response to multiple input signals, the method comprising the steps of:

summing outputs of selected constant-load controllers to develop inputs for selected actuator plants, each one of said actuator plants being controlled by self-adaptive feedback control loops with pole-tracking zeroes, said actuator plants serving as output load for said controllers;

summing outputs of selected ones of said actuator plants to produce a plurality of actuator signals;

driving loads with said actuator signals;

providing feedback of said actuator signals to said actuator plants to allow pole tracking of zeroes; and providing feedback of said actuator signals to said controllers for conventional steady-state feedback, such that each of said controllers sees a constant load and has a constant gain-bandwidth characteristic.

2. A feedback control system comprising:

a network of constant-load controllers; and a network of actuator plants, each one of said actuator plants being coupled to receive as input a summation of outputs of selected ones of said constant load controllers, each one of said actuator plants being controlled by self-adaptive feedback control loops with pole-tracking zeroes, said network of actuator plants serving as output load for said network of controllers such that each of said controllers sees a constant load and has a constant gain-bandwidth characteristic.

3. The feedback control system of claim 2 wherein a first one of said controllers receiving a first input has the same poles and power output as a second one of said controllers, said second one of said controllers also receiving said first input;

wherein a third one of said controllers receiving a second input has the same poles and power output as a fourth one of said controller, said fourth one of said controllers also receiving said second input;

wherein output of said first one of said controllers and said third one of said controllers is summed at a first summer;

wherein output of said second one of said controllers and said fourth one of said controllers is summed at a second summer;

wherein a first one of said actuator plants is coupled to receive output of said first summer and a third one of said actuator plants is coupled to receive output of said second summer and have substantially identical pole-tracking characteristics;

wherein a second one of said actuator plants is coupled to receive output of said first summer and a fourth one of said actuator plants coupled to receive output of said second summer and have substantially identical pole-tracking characteristics;

wherein output of said first one of said actuator plants and output of said third one of said actuator plants are coupled to a third summer, output of said third summer being coupled to a first dynamic load and in a phase inversion feedback loop to a fifth summer at input to said first one and said second one of said controllers; and wherein output of said second one of said actuator plants and output of said fourth one of said actuator plants are coupled to a fourth summer, output of said fourth summer being coupled to a second dynamic load and in a phase inversion feedback loop to a sixth summer at input to said third one and said fourth one of said controllers.

4. The feedback control system according to claim 3 further including a data update module coupled to each one of said controllers for generating digital sampling.

5. The feedback control system according to claim 3 further including means for activating a pilot pole in each one of said controllers.

\* \* \* \* \*